United States Patent Office.

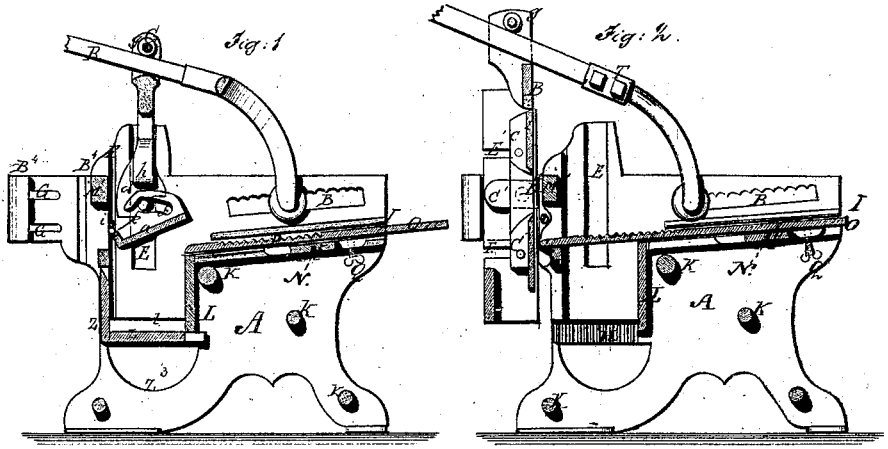
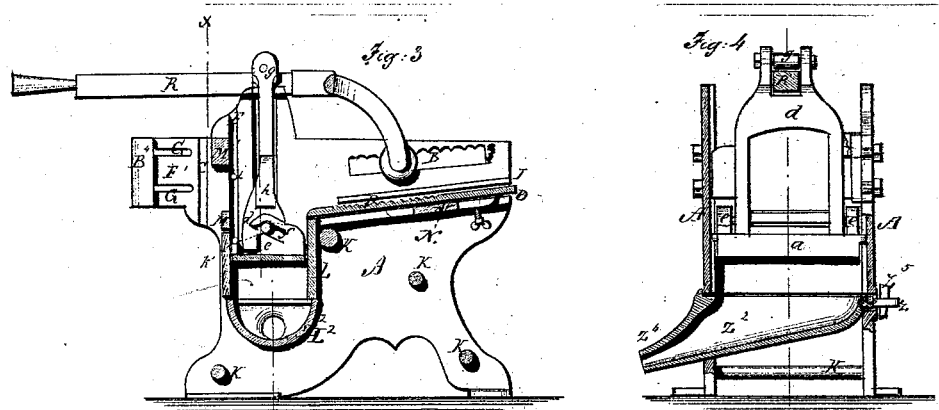
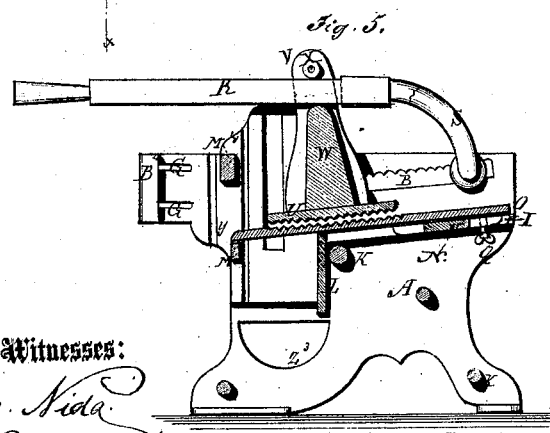

ALEXANDER W. PAGETT, OF SPRINGFIELD, OHIO.

Letters Patent No. 104,192, dated June 14, 1870.

IMPROVEMENT IN VEGETABLE-CUTTER AND SCRAPER.

The Schedule referred to in these Letters Patent and making part of the same.

*To all whom it may concern :*

Be it known that I, ALEXANDER W. PAGETT, of Springfield, in the county of Clark and State of Ohio, have invented a new and improved Vegetable-Cutter, Scraper, &c.; and I do hereby declare that the following is a full, clear, and exact description thereof, which will enable others skilled in the art to make and use the same, reference being had to the accompanying drawing forming part of this specification.

This invention relates to improvements in machines for mashing, cutting, pressing, and scraping vegetables for food, fruit for making cider, wine, &c., and for crushing beef-steak, stuffing sacks for sausages, and other like uses.

The invention consists in a peculiar construction and arrangement in one machine of a mashing apparatus, a pressing apparatus for separating the juice from the pomace, also applicable for stuffing, a cutting, and a scraping apparatus, under an arrangement whereby all the operating parts may be worked by one hand-lever, and whereby the same may be simply and cheaply constructed.

Figure 1 is a longitudinal sectional elevation of my improved machine, as arranged for pressing;

Figure 2 is a sectional elevation of the same, as arranged for cutting or slicing;

Figure 3 is a similar sectional elevation, as arranged for stuffing;

Figure 4 is a transverse section of fig. 3, taken on the line $x\ x$; and

Figure 5 is a sectional elevation, as arranged for crushing.

Similar letters of reference indicate corresponding parts.

A A are two housing or side plates, constituting the main portion of the frame, and between which the operative parts are placed. They are made of cast-iron, and provided with the slots B, with notched or corrugated upper walls, the vertical grooves E and F, projections F', horizontal slots G therein, horizontal grooves H and inclined grooves I. They are connected to the ends of the vertical plates L M and M', and the inclined plate N, by the transverse screw-rods K.

O is a sliding table, provided with a roughened or pointed upper surface at P, and arranged to slide in the grooves I in the side-plates, for adjustment either in the position represented in fig. 1 or fig. 2, by the set-screw Q passing up against it, through a part of the plate N.

R is a curved and crotched hand-lever, fitted with journals at the ends of the crotched parts S, adapted to take into the slots B for a fulcrum. One of the parts S of the lever is connected to the main part by bolts T, so that it may be detached for connecting the journals in the slots or removing them therefrom.

V is a crushing-plate, having a roughened or pointed surface similar to the pointed surface P of the table O, and arranged by connection with the lever for operation in conjunction with the said table for crushing vegetables, fruit or beef-steak. The connection with the lever is by means of the arms V, stand W, and pin X, the latter passing through the arms above the lever R, confining it against the top of the stand. By this connection the position of the lever may be readily changed to vary the leverage by sliding it therein. To admit of this is the object of the long slots B in the plates A, for the journals of the lever and the grooves in the upper walls thereof prevent the journals from slipping.

When the machine is to be used for crushing, the table may be either in the position represented in figs. 1 or 5. If for crushing fruit for cider, which requires the pomace to be delivered into the pressing-case, it will be as in fig. 1; but if for crushing vegetables or other substances to be delivered through the space $y$, it will be as in fig. 5. It will also be as in fig. 5 when the machine is arranged for slicing or cutting fruit or vegetables, as will be presently described.

The pressing-chamber is the space between the side plates, the vertical plates L, and the angle-plates Z Z', which slide in the horizontal grooves H in the plates A.

$a$ is the press-follower, fitted to the pressing-case, and connected to the journals $b$ of the connecting and pressing-rods $d$ by the end plates $e$ and curved slots $f$ therein. These connecting-rods are united near the top, and slotted thereat for the reception of the lever R, below the pin $g$. They are also provided with projecting lugs $h$, which work in the grooves E, to move the follower up and down when the bar is vibrated.

It is desirable to supply the pomace under the follower without having to raise the lever too high. It is for this reason that the curved slots $f$ are provided for the journals of the rods $d$, to admit of tilting the follower upward at the receiving side by means of rods $i$ passing from one to the other of the plates A through the grooves F, which arrests the upward movement of that side of the follower and tilts it, as clearly shown in fig. 1. The follower is provided with journals $k$, which work in the grooves F, to control its position.

The force is applied to the follower in pressing by the lower ends of the connecting-rod D, which project downward below the journals $b$, for that purpose, and to take the said force off the journals.

The angle-plate Z Z' is provided with the vertical side pieces $l$, which work in the grooves H, and, like the vertical walls of the said grooves, they are provided with vertical grooves, as shown in fig. 2, which, together with them, afford escape-passages for the cider into troughs or other receptacles below.

For stuffing bags, sausages, or other articles, the angle-plate Z Z$^1$ is withdrawn, and a trough, Z$^2$, is substituted by sliding up through the oval orifice Z$^3$ in one of the side plates A, and passing a projection, Z$^4$, through a small hole, Z$^6$, in the other plate, to receive a key, Z$^5$, for holding it in place. This trough is provided with a nozzle, Z$^6$, at one end, or it may be at the center of the bottom, to which nozzle the bags or other articles to be stuffed may be attached in any approved way. The stuffing is effected by the follower acting on the contents of the pressing-case in the same way as in pressing pomace.

The crushing device U is removed when the presser or stuffing are to be performed.

For slicing or scraping, a knife-carrier, B$^1$, and knife B$^2$, or roughened surfaces are used. The said knife-carrier consists of the frame B$^1$, arranged to work up and down between the plates A, in front of the plates M M', and between guides B$^3$ and B$^4$, the latter being adjustable to or from the others, for controlling the frame B properly.

The knife B$^1$ is provided with right-angled arms C$^1$, by which it is pivoted to the frame, so as to vibrate for cutting either in the up or down movement.

C$^2$ are gauges attached to the knife-frame, so as to be adjustable to or from the knife, for varying the space to cut thicker or thinner. These guides have screws passing through slots E' in the frame B$^1$, by which the adjustment is effected.

Any suitable stops may be provided to arrest the vibrations of the cutter at the required points.

When the machine is to be used for cutting, the table O is adjusted to the position represented in fig. 2, to feed the apples or other articles to the cutter. The cutter-frame is connected to the lever in the same manner that the crusher and presser are.

I propose to substitute, in some cases, for the knife, scraping-surfaces of roughly-perforated sheet-metal or other substance, to be attached to the frame in any way, when I wish to grate the vegetables, instead of cutting or slicing them.

I do not desire to limit myself to the construction of the side frames A for the application of all these appliances, but propose to construct them with the necessary slots, grooves, projections, &c., necessary for the application of any one set or all the said appliances, as may be required.

I am aware that the particular parts or devices of which my machine consists, are not new in themselves; but What I esteem to be of my invention, and desire to protect by Letters Patent, is—

The side plates A A, notched, grooved, and slotted, as shown, combined with sliding table O, curved lever R, crushing plate U, stand W, arms V, and pin $x$, all constructed and arranged as and for the purpose set forth.

A. W. PAGETT.

Witnesses:
NED PAGETTE,
D. W. PAGETT.